Patented Aug. 28, 1934

1,971,476

UNITED STATES PATENT OFFICE 1,971,476

PROCESS OF PREPARING CONDENSATION PRODUCTS

Fritz Bitterich, Berlin-Schoneberg, Germany, assignor, by mesne assignments, to Bakelite Corporation, New York, N. Y., a corporation of Delaware No Drawing. Application April 8, 1931, Serial No. 528,705. In Germany April 14, 1930

5 Claims. (Cl. 260—3)

The condensation of urea with formaldehyde is well known. In place of urea, its derivatives have also been used as starting materials. Modified urea-derivatives have never been considered for resin preparation heretofore, and the surprising fact has been discovered that they may be readily condensed further with aldehydes, as for example formaldehyde or its polymers, or with materials giving off formaldehyde, such as hexamethylenetetramine, or with furfural. These urea derivatives are substances, which are obtained when urea or its dirivatives are reacted by heating with anhydrides of polybasic acids, such as phthalic anhydride, or with the derivatives of such polybasic acid anhydrides.

As an instance, urea and phthalic anhydride have been fused together. The best ratio of reacting materials has been found to be 1 mol. phthalic anhydride to 2 mols. urea. The quantity of either substance may vary and is not limited to the ratio stated above. The reaction between phthalic anhydride and urea is carried out by direct heating of both materials. At about 150° C. and with some foaming, a considerable quantity of water is given off as steam. The reaction is very vigorous. It may be kept under control, however, if one of the components is added gradually to the other which is in molten form. In order to obtain a substance that readily reacts with aldehydes, as for example, formaldehyde, it is necessary to heat the reaction mass of urea and phthalic acid for some time, say from 10 minutes up to an hour, at a temperature of about 200° C., after the main reaction has been carried out. The molten mixture is then allowed to cool sufficiently with stirring, so that the aqueous formaldehyde may be added without danger. The addition of the formaldehyde may be made all at once or in portions. In place of formaldehyde, a water solution of paraform may be used, or a part of the formaldehyde may be replaced by acetaldehyde. After the addition of the aldehyde the mixture is heated for a time, say 5 minutes to an hour, in a closed vessel in the stirring, at a temperature slightly over 100° C., say 110° C. Then the water is distilled off. If the period of heating with the formaldehyde is too short, resins are obtained from which crystals will have separated out.

By the process described clear, colorless resins are obtained which are brittle when cold, hardenable by heat, and suitable for a great variety of uses. They can, for example, be mixed with fillers, and by molding and heating, or by simultaneous application of heat and pressure, be made into molded objects. They also can be dissolved in solvents to find application as varnishes. They can also be hardened by themselves.

The fusion of the phthalic acid with the urea as well as the conversion of the molten mixture with formaldehyde or its polymers can be carried out either with or without catalysts. As catalysts, materials such as hydrochloric acid, or zinc chloride or oxide can be used. The catalyst can be added in several portions or at various stages of the preparation or manufacture, or else several catalysts can be used simultaneously or one after the other. The fusion of the urea and the phthalic acid can also be carried out in the presence of a sufficiently high-boiling solvent, such as hexalin acetate, methylene glycol, or glycerin.

The specified conditions of time, temperature, ratio of component materials, etc. refer to the processing of urea, phthalic acid and formaldehyde and must be correspondingly changed, when other reaction components, such as a urea derivative, or other acid anhydrides or aldehydes, are used. The reaction of the acid anhydride on urea or its derivative may also take place in the presence of other materials, such as high boiling solvents, fillers, natural or artificial resins, or similar materials. These other materials may, however, be added at any other suitable stage of the preparation or manufacture, as for example before, during or after the condensation with the aldehyde. It is also possible to carry out the condensation with only a part of the aldehyde, and then to add the remainder at a suitable later stage in the preparation or manufacture.

Example 1

50 kg. phthalic anhydride and 40 kg. urea are fused together and held molten for a time at 200° C. When the mass has cooled to 80° C., 80 kg. of 40% formaldehyde are added, and the reaction is carried on by heating ½ hour at 110°. The water is then driven off either in the atmosphere or in vacuum.

Example 2

Procedure is as in Example 1. After the treatment with formaldehyde, but before the removal of the water, 5–20 kg. of glycerine are worked into the mixture. It is again heated for a time to 150–200° C. and a clear substance, kneadable at room temperature is obtained.

Example 3

Procedure is as in Example 1, save that the fusion of phthalic acid and urea is carried out in the presence of ½% of zinc chloride, based on the phthalic acid.

*Example 4*

Procedure is as in Example 1 in the presence of 20% glycerine, calculated on the phthalic anhydride.

In place of urea, urea derivatives, such as thiourea, phenyl or diphenyl urea may be used, as well as other urea derivatives, such as biuret. In place of phthalic acid, anhydrides of other polybasic acids such as tartaric or malic acids, or the derivatives of such acid anhydrides as, for instance, substituted phthalic acid compounds such as a chlorinated phthalic acid, may be used.

I claim:

1. Process of preparing condensation products which comprises heating phthalic anhydride with urea in the proportions of 1 mol. of phthalic anhydride to 2 mols. of urea to about 200° C., cooling the mass, adding aqueous formaldehyde thereto and heating the resulting mixture to about 110° C.

2. Process of preparing resinous condensation products which comprises reacting an anhydride of an organic polybasic acid with a urea, the latter in excess of the molecular ratio required to react with the anhydride, and converting the resulting product with an aldehyde into a resin.

3. Process according to claim 2 characterized by the addition of the aldehyde to the reaction mass in several steps.

4. Process of preparing resinous condensation products which comprises reacting phthalic anhydride with urea, the latter in excess of the molecular ratio required to react with the anhydride, and converting the resulting product into a resin with formaldehyde.

5. As a composition of matter a clear colorless resinous product characterized by brittleness when cold and hardenable by heat, such as is obtained by combining an anhydride of an organic polybasic acid with a urea in excess of the molecular ratio required to react with the anhydride and then reacted with an aldehyde.

FRITZ BITTERICH.